(12) United States Patent  
Godha et al.

(10) Patent No.: US 12,055,403 B2  
(45) Date of Patent: Aug. 6, 2024

(54) ADJUSTING HEADING SENSOR OUTPUT BASED ON IMAGE DATA

(71) Applicant: Apple Inc., Cupertino, CA (US)

(72) Inventors: Saurabh Godha, Santa Clara, CA (US); Hyojoon Bae, San Jose, CA (US); Isaac T. Miller, Half Moon Bay, CA (US); Robert W. Mayor, Half Moon Bay, CA (US)

(73) Assignee: Apple Inc., Cupertino, CA (US)

( * ) Notice: Subject to any disclaimer, the term of this patent is extended or adjusted under 35 U.S.C. 154(b) by 840 days.

(21) Appl. No.: 16/583,195

(22) Filed: Sep. 25, 2019

(65) Prior Publication Data

US 2020/0348143 A1 Nov. 5, 2020

Related U.S. Application Data

(60) Provisional application No. 62/843,264, filed on May 3, 2019.

(51) Int. Cl.
*G01C 21/36* (2006.01)
*G01C 21/18* (2006.01)
(Continued)

(52) U.S. Cl.
CPC ......... *G01C 21/3602* (2013.01); *G01C 21/18* (2013.01); *G06T 7/73* (2017.01);
(Continued)

(58) Field of Classification Search
CPC ....... H04W 4/027; H04W 4/026; H04W 4/38; G06T 7/73; G01C 21/18; G01C 21/3602
See application file for complete search history.

(56) References Cited

U.S. PATENT DOCUMENTS 9,081,383 B1 * 7/2015 Montemerlo ........ G05D 1/0212
9,341,720 B2 5/2016 Garin et al.
(Continued)

FOREIGN PATENT DOCUMENTS

| CN | 107110651 A | 8/2017 |
| CN | 109211249 A | 1/2019 |
| JP | 5262232 B | 8/2013 |

OTHER PUBLICATIONS

International Search Report and Written Opinion from PCT/US2020/0026665, dated Jul. 3, 2020, 30 pages.
(Continued)

*Primary Examiner* — Peter D Nolan  
*Assistant Examiner* — Wae L Louie  
(74) *Attorney, Agent, or Firm* — BAKERHOSTETLER

(57) ABSTRACT

A device implementing a system for estimating device orientation includes at least one processor configured to obtain a first estimate for a heading of a device, the first estimate being based on output from a magnetometer of the device. The at least one processor is further configured to capture image data using an image sensor of the device, and determine at least one second estimate of the heading based on correlating the image data with mapping data. The at least one processor is further configured to determine a bias associated with output of the magnetometer based on the first estimate and the at least one second estimate, and adjusting output of the magnetometer based on the determined bias.

21 Claims, 8 Drawing Sheets

(51) Int. Cl.
  *G06T 7/73* (2017.01)
  *H04W 4/02* (2018.01)
  *H04W 4/38* (2018.01)

(52) U.S. Cl.
  CPC ........... *H04W 4/026* (2013.01); *H04W 4/027* (2013.01); *H04W 4/38* (2018.02)

(56) References Cited

U.S. PATENT DOCUMENTS

| | | | |
|---|---|---|---|
| 9,423,252 B2 | 8/2016 | Chow et al. | |
| 9,818,037 B2 | 11/2017 | Al-Hamad et al. | |
| 9,972,212 B1* | 5/2018 | Sperindeo | G06T 7/90 |
| 10,589,931 B2* | 3/2020 | Jarvis | G01C 21/206 |
| 10,803,420 B2* | 10/2020 | Jarvis | G06Q 10/0875 |
| 11,084,410 B1* | 8/2021 | Bhaskaran | B66F 9/063 |
| 2009/0254294 A1* | 10/2009 | Dutta | G01C 17/28 |
| | | | 702/92 |
| 2010/0191459 A1* | 7/2010 | Carter | G06F 16/444 |
| | | | 348/222.1 |
| 2012/0136573 A1* | 5/2012 | Janardhanan | G01C 22/006 |
| | | | 701/500 |
| 2014/0104437 A1* | 4/2014 | Chao | G01C 21/005 |
| | | | 348/E17.002 |
| 2015/0019159 A1 | 1/2015 | Elgersma et al. | |
| 2017/0004630 A1* | 1/2017 | Al-Hamad | G01S 19/485 |
| 2017/0023379 A1 | 1/2017 | El-Ghazal et al. | |
| 2017/0337960 A1 | 11/2017 | Arth et al. | |
| 2018/0321328 A1* | 11/2018 | Kushleyev | G01C 17/28 |
| 2020/0017117 A1* | 1/2020 | Milton | B60W 50/02 |
| 2020/0064837 A1* | 2/2020 | Zhang | G05D 1/0246 |
| 2020/0341117 A1* | 10/2020 | Sandford | G01S 17/93 |
| 2020/0348143 A1* | 11/2020 | Godha | H04W 4/026 |
| 2020/0348423 A1* | 11/2020 | Bae | G01S 19/485 |
| 2021/0027629 A1* | 1/2021 | Tao | G08G 1/166 |
| 2021/0092555 A1* | 3/2021 | Mayor | G06F 18/253 |
| 2021/0155158 A1* | 5/2021 | Shaikh | G08G 1/0969 |
| 2021/0183093 A1* | 6/2021 | Park | G06V 20/58 |
| 2021/0341631 A1* | 11/2021 | Liu | G01S 19/49 |
| 2022/0137237 A1* | 5/2022 | Bae | H04N 21/44008 |
| | | | 701/468 |

OTHER PUBLICATIONS

Chinese Office Action from Chinese Patent Application No. 202010358060.6, dated Jan. 12, 2024, 12 pages including English language translation.

\* cited by examiner

ADJUSTING HEADING SENSOR OUTPUT BASED ON IMAGE DATA

CROSS-REFERENCE TO RELATED APPLICATIONS

The present application claims the benefit of U.S. Provisional Patent Application Ser. No. 62/843,264, entitled "Adjusting Heading Sensor Output Based on Image Data," filed May 3, 2019, which is hereby incorporated by reference in its entirety for all purposes.

TECHNICAL FIELD

The present description relates generally to estimating the position and/or orientation of a device, including using an image sensor of the device in estimating and/or correcting device position and/or orientation.

BACKGROUND

An electronic device such as a laptop, tablet, smart phone or a wearable device may include a Global Navigation Satellite System (GNSS) receiver and one or more sensors (e.g., an accelerometer, a gyroscope such as a rate gyroscope) that may be used in conjunction with each other to estimate the position and/or orientation of the electronic device.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
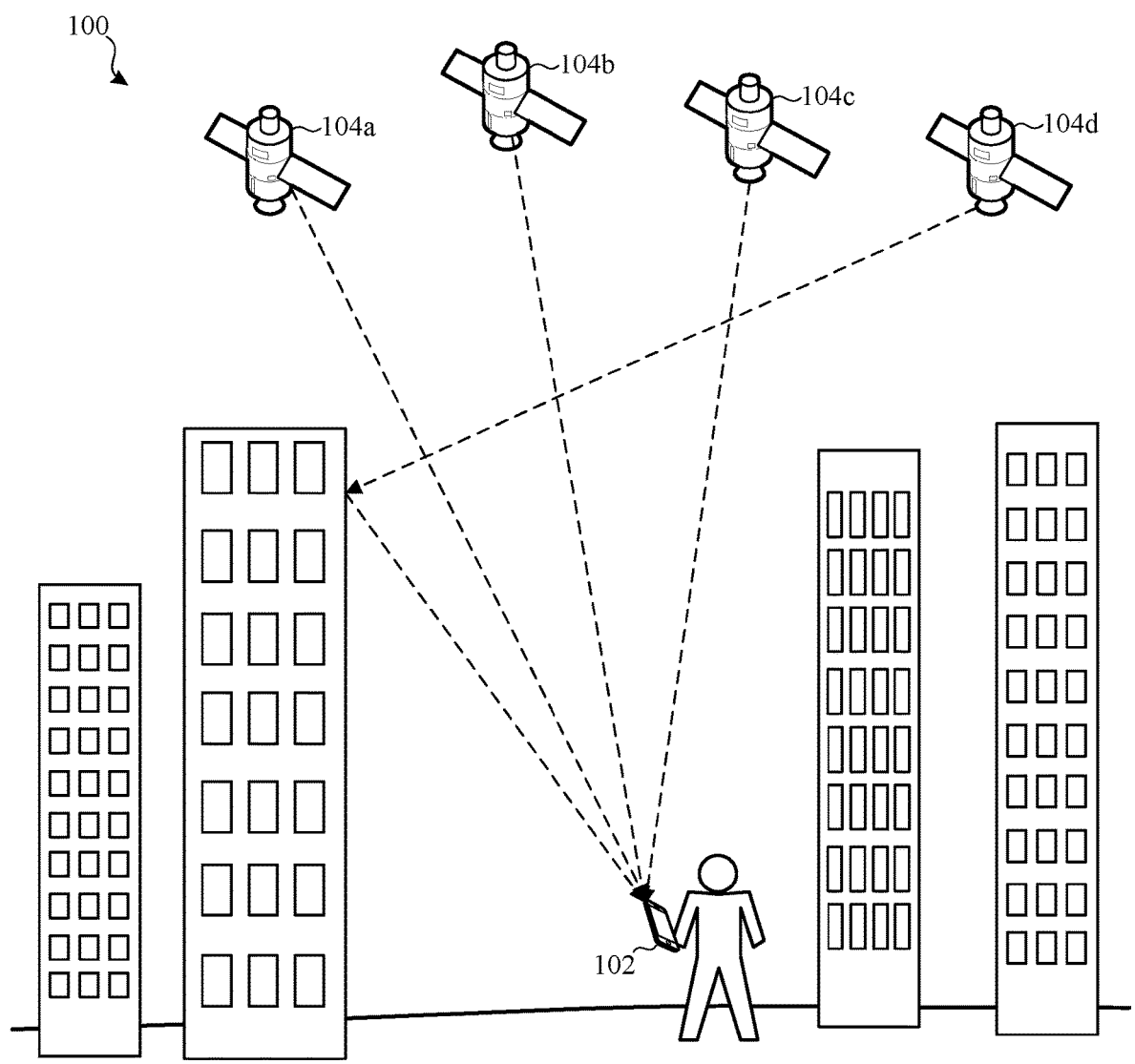
FIG. 1 illustrates an example environment in which one or more electronic devices may implement the subject system for estimating device position and/or orientation in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

An electronic device may include a GNSS receiver and one or more sensors (e.g., an accelerometer, a gyroscope such as a rate gyroscope) that may be used in conjunction with each other to estimate the position and/or orientation of the electronic device. The electronic device may further include image sensor(s) which may be used to estimate device position and/or orientation. The device orientation may include one or more parameters, including heading (e.g., angle relative to magnetic north), pitch (e.g., motion about the lateral axis) and roll (e.g., motion about the longitudinal axis).

Moreover, the electronic device may include a GNSS receiver configured to provide device position and/or direction of travel, as well as a magnetometer configured to indicate heading information (e.g., as part of a digital compass). An augmented reality application, for example, may use one or more of the estimates for device position and/or orientation (e.g., heading), in order to integrate digital content (e.g., visual, audio and/or tactile) into images of the user's real-world environment (e.g., as being captured by the image sensor and displayed in real-time).

The subject system provides for using multiple sensors of the electronic device in order to estimate device position and/or orientation. For example, the electronic device may obtain a first estimate for device heading based on output from a magnetometer. The electronic device may also capture image data using an image sensor, and determine a second estimate of the heading based on correlating the image data with mapping data (e.g., roads with known locations). For example, the image data may depict a road, and the electronic device may identify a vanishing point on the road (e.g., a point where parallel lines appear to converge). The electronic device may align the road in the image with a road in the mapping data based on device location (e.g., as provided by the GNSS receiver). The electronic device may determine a bias associated with output of the magnetometer (e.g., bias attributable to the magnetometer) based on the first and second estimates, and adjust output of the magnetometer based on the determined bias. Thus, it is possible to adjust magnetometer output for improved estimation of device heading.

In another example, the GNSS receiver of the electronic device may receive a first estimated position of a device at a first time. The image sensor of the electronic device may capture images during a time period defined by the first time and a second time (e.g., where the first and second times correspond to a sampling interval of the GNSS receiver). The electronic device may determine, based on the images, a second estimated position of the device, the second estimated position being relative to the first estimated position (e.g., where the first position corresponds to a reference point, and the second position is an amount of measured change from the reference point). Moreover, the GNSS receiver may receive a third estimated position of the device at the second time, and estimate a location of the device based on the second estimated position and the third estimated position. Thus, it is possible to supplement GNSS position estimates with relative positioning estimates provided in conjunction with the image sensor, for improved device location estimation.

FIG. 1 illustrates an example environment 100 in which one or more electronic devices may implement the subject system for estimating device position and/or orientation in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The environment 100 includes an electronic device 102 and GNSS satellites 104a, 104b, 104c and 104d (hereinafter "the GNSS satellites 104a-104d"). For explanatory purposes, the environment 100 is illustrated in FIG. 1 as including the one electronic device 102 and the four GNSS satellites 104a-104d; however, the environment 100 may include any number of electronic devices and any number of GNSS satellites.

The electronic device 102 may be, for example, a portable computing device such as a laptop computer, a smartphone, a device embedded in, installed in, and/or coupled to a vehicle, a peripheral device (e.g., a digital camera, headphones), a tablet device, a wearable device such as a smartwatch, a band, and the like, or any other appropriate device that includes, for example, one or more wireless interfaces, such as GNSS radios, WLAN radios, cellular radios, Bluetooth radios, Zigbee radios, near field communication (NFC) radios, and/or other wireless radios. In FIG. 1, by way of example, the electronic device 102 is depicted as a smartphone. The electronic device 102 may be, and/or may include all or part of, the electronic device discussed below with respect to FIG. 2, and/or the electronic system discussed below with respect to FIG. 8.

In the example of FIG. 1, the electronic device 102 is held by or otherwise coupled to (e.g., via pocket or strap) a user. However, the electronic device 102 may be coupled to and/or contained within a vehicle. In the example of FIG. 1, the user is traveling by foot (e.g., walking). However, the user may be traveling within a vehicle (e.g., a land vehicle such as an automobile, a motorcycle, a bicycle, or a watercraft or an aircraft vehicle), on a bicycle, through water (e.g., swimming) and/or by other means.

In the environment 100, the electronic device 102 may determine its location based on signals received from GNSS satellites 104a-104d. For example, the GNSS satellites 104a-104d may be compatible with one or more of the Global Positioning System (GPS), the Globalnaya Navigazionnaya Sputnikovaya Sistema (GLONASS), the Galileo positioning system, and/or generally any positioning system.

For example, the electronic device 102 may determine its respective position (e.g., longitude, latitude, and altitude/elevation) using signals received from the GNSS satellites 104a-104d. Other positioning technologies (not shown) may be used independent of or in conjunction with GNSS (e.g., the GNSS satellites 104a-104d) to determine device location. For example, the location of the electronic device 102 may be determined based on time of arrival, angle of arrival, and/or signal strength of signals received from wireless access points which may have known locations (e.g., within a building or store, mounted on street posts, etc.). Alternatively or in addition, positioning technologies such as, but not limited to, cellular phone signal positioning, (e.g., positioning using cellular network and mobile device signals), indoor positioning systems, Bluetooth signal positioning and/or image recognition positioning may be used to determine device location.

Moreover, the electronic device 102 may implement an inertial navigation system (INS). The INS uses device sensor(s) (e.g., motion sensors such as accelerometers and/or rate gyroscopes) to calculate device state (e.g., device position, velocity, attitude) for supplementing location data provided by the above-mentioned positioning technologies in order to estimate device location.

Figure 2:
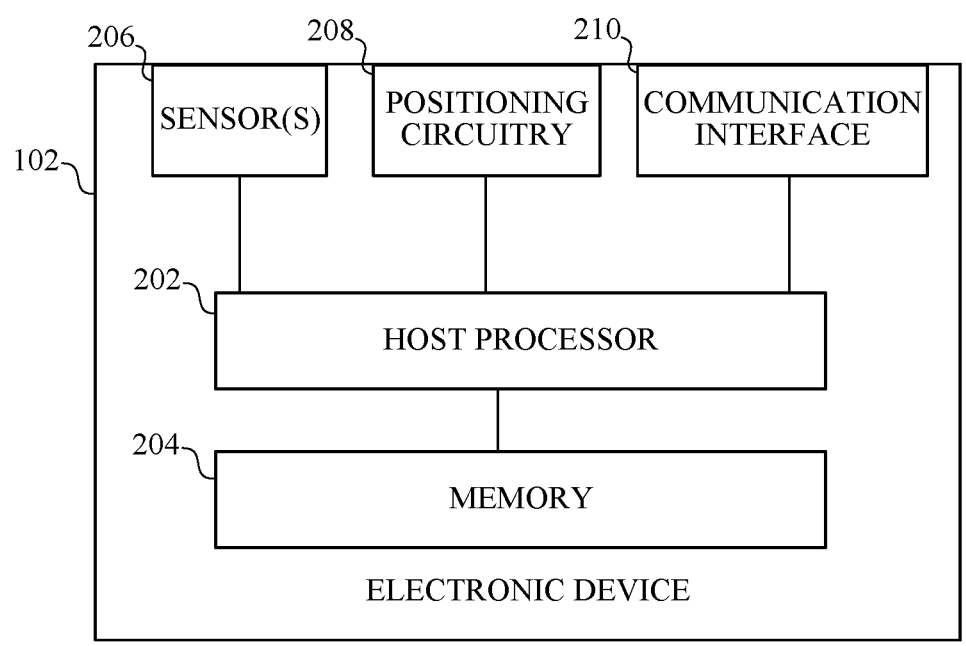
FIG. 2 illustrates an example electronic device that may implement the subject system for estimating device position and/or orientation in accordance with one or more implementations.

FIG. 2 illustrates an example electronic device that may implement the subject system for estimating device position and/or orientation in accordance with one or more implementations. For explanatory purposes, FIG. 2 is primarily described herein with reference to the electronic device 102 of FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102 may include a host processor 202, a memory 204, one or more sensor(s) 206, positioning circuitry 208 and a communication interface 210. The host processor 202 may include suitable logic, circuitry, and/or code that enable processing data and/or controlling operations of the electronic device 102. In this regard, the host processor 202 may be enabled to provide control signals to various other components of the electronic device 102. The host processor 202 may also control transfers of data between various portions of the electronic device 102. The host processor 202 may further implement an operating system or may otherwise execute code to manage operations of the electronic device 102.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

In one or more implementations, the memory 204 may store values for sensor signal measurements, GNSS receiver data, device position estimates and/or device orientation estimates, for example, based on motion of the electronic device 102. The memory 204 may also store component(s) and/or module(s) configured to estimate device position and/or location, for example, as discussed with respect to the architectures of FIGS. 3-5 as discussed below. Moreover, the memory 204 may store an application (e.g., an augmented reality application) which is configured to integrate digital content (e.g., visual, audio and/or tactile) into images of a real-world environment (e.g., as captured by an image sensor). In one or more implementations, the augmented reality application may be part of or otherwise incorporated within the operating system of the electronic device 102.

The sensor(s) 206 may include one or more motion sensor(s), such as an accelerometer and/or a gyroscope (e.g., a rate gyroscope). The motion sensor(s) may be used to facilitate movement and orientation related functions of the electronic device 102, for example, to detect movement, direction, and orientation of the electronic device 102.

Alternatively or in addition, sensor(s) 206 may include one or more of a barometer, an electronic magnetometer, an image sensor, or generally any sensor that may be used to facilitate a positioning system. The barometer may be utilized to detect atmospheric pressure, for use in determining altitude change of the electronic device 102. The electronic magnetometer (e.g., an integrated circuit chip) may provide data used to determine the direction of magnetic north, for example to be used as part of a digital compass. The image sensor (e.g., a camera) may be used to capture images (e.g., photographs, video) to derive position and/or sequences of images to derive device motion. Captured single images and/or sequences of images may also be used to derive orientation of the image sensor (e.g., and/or electronic device 102).

The positioning circuitry 208 may be used in determining the location of the electronic device 102 based on positioning technology. For example, the positioning circuitry 208 may provide for one or more of GNSS positioning (e.g., via a GNSS receiver configured to receive signals from the GNSS satellites 104a-104d), wireless access point positioning (e.g., via a wireless network receiver configured to receive signals from wireless access points), cellular phone signal positioning, Bluetooth signal positioning (e.g., via a Bluetooth receiver), image recognition positioning (e.g., via an image sensor), and/or an INS (e.g., via motion sensors such as an accelerometer and/or gyroscope).

The communication interface 210 may include suitable logic, circuitry, and/or code that enables wired or wireless communication, such as between the electronic device 102. The communication interface 210 may include, for example, one or more of a Bluetooth communication interface, an NFC interface, a Zigbee communication interface, a WLAN communication interface, a USB communication interface, or generally any communication interface.

In one or more implementations, one or more of the host processor 202, the memory 204, the sensor(s) 206, the positioning circuitry 208, the communication interface 210, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
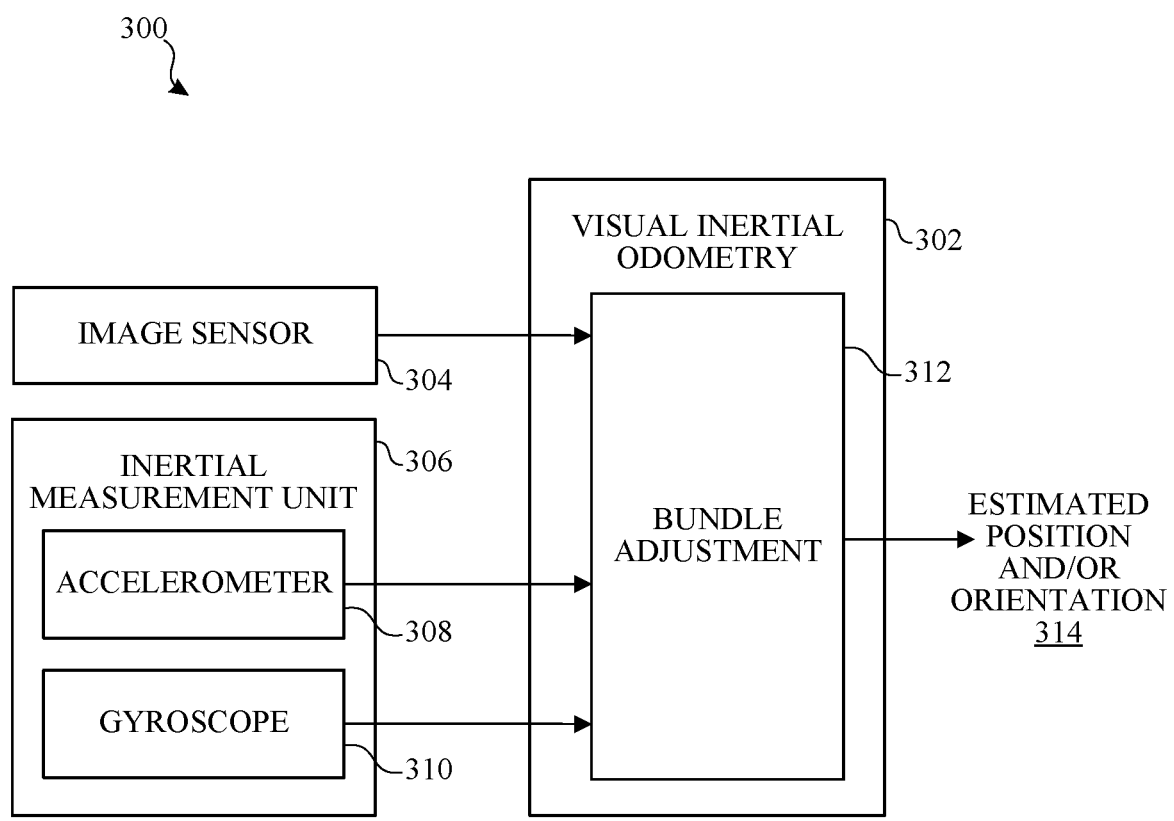
FIG. 3 illustrates an example architecture, that may be implemented by an electronic device, for estimating device position and/or orientation in accordance with one or more implementations.

FIG. 3 illustrates an example architecture 300, that may be implemented by the electronic device 120, for estimating device position and/or orientation in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

In one or more implementations, the architecture 300 may provide for improved estimates of device position and/or orientation, for example, for use by an augmented reality application. The improved estimates may be used in presenting digital content (e.g., visual, audio and/or tactile feedback) in images of a real-world environment (e.g., as being captured by the image sensor 304). For example, the timing and/or positioning of notifications (e.g., prompts, overlays, audio cues, tactile feedback and the like) may be based on the estimates provided by the architecture 300.

The architecture 300 may include an image sensor 304, an inertial measurement unit 306 which includes an accelerometer 308 and a gyroscope 310, and a visual inertial odometry module 302 which includes a bundle adjustment module 312. The bundle adjustment module 312 may be configured to output an estimated position and/or orientation 314 of the electronic device 102. In one or more implementations, one or more of the sensors 304, 308 and 310 may correspond to the sensor(s) 206 in FIG. 2.

The visual inertial odometry module 302 may receive data including image data from the image sensor 304, accelerometer data from the accelerometer 308, and/or orientation or angular velocity data from the gyroscope 310. For explanatory purposes, FIG. 3 illustrates a single image sensor 304, accelerometer 308 and gyroscope 310; however, any number of image sensors, accelerometers and/or gyroscopes may be used.

In one or more implementations, the accelerometer 308 and the gyroscope 310 may be part of the inertial measurement unit (IMU) 306, which is configured to measure linear and angular motion of the electronic device 102, and/or the IMU 306 may receive measurements from the accelerometer 308 and/or the gyroscope 310. The IMU may be part of an INS. As noted above, an INS may use measurement data (e.g., provided by the accelerometer 308 and/or the gyroscope 310) to calculate device state (e.g., position, velocity, attitude) for supplementing location data provided by positioning technologies (e.g., GNSS and/or wireless access point positioning) in order to estimate device location.

In one or more implementations, the visual inertial odometry module 302 is configured to provide an estimated position and/or orientation 314 of the electronic device 102 relative to a starting position. The visual inertial odometry module 302 may determine such estimates based on input received from the image sensor 304, the accelerometer 308 and the gyroscope 310. The estimated position may correspond to one or more of latitude, longitude and altitude relative to the starting position. Moreover, the estimated orientation may correspond to one or more of the heading (e.g., angle relative to magnetic north), pitch (e.g., motion about the lateral axis) and roll (e.g., motion about the longitudinal axis) relative to the starting position.

With respect to the image data captured by the image sensor 304, the visual inertial odometry module 302 may track multiple features (e.g., corresponding to corners, edges, shapes and/or other image features) across sequential images (e.g., in a stream of images, such as a video), and may use the tracking to determine the estimated position and/or orientation 314. In one or more implementations, the visual inertial odometry module 302 may use one or more of: keyframes within the image data, assumptions with respect to scenery (e.g., a ground plane assumption, known camera height) and/or prior knowledge regarding a particular scene/imagery (e.g., a database storing images of objects with known locations).

The visual inertial odometry module 302 may be configured to match features (e.g., points) across multiple images, and to determine relative position and/or orientation between image pairs. Moreover, the bundle adjustment module 312 of the visual inertial odometry module 302 may use measurements from one or more of the image sensor 304, the accelerometer 308 and the gyroscope 310, to perform bundle adjustment for improved estimates. For example, the bundle adjustment may use parameters of relative motion (e.g., as provided by the accelerometer 308 and/or the gyroscope 310) and optical characteristics of the image sensor 304, to determine and/or refine 3D coordinates describing image geometry.

It is noted that bundle adjustment is one of several techniques that may be used (e.g., separately or in combination) to estimate orientation and/or position. Although the visual inertial odometry module 302 is illustrated as using bundle adjustment via the bundle adjustment module 312 to estimate device position and/or orientation, it is possible for the visual inertial odometry module 302 to perform refinement (e.g., filtering) in other manners. In this regard, the bundle adjustment module 312 is one example component for blending together the information, measurements and assumptions described herein. Other filters (e.g., Bayesian, non-Bayesian) and/or estimators may be used in lieu of, or as a supplement to, the bundle adjustment module 312. For example, such filter(s) may correspond to a Kalman filter, particle filter, a sigma point filter and/or any other type of filter configured to estimate device position and/or orientation as described herein.

In one or more implementations, one or more of components of the image sensor 304, the inertial measurement unit 306 (including the accelerometer 308 and the gyroscope 310), and/or the visual inertial odometry module 302 (including the bundle adjustment module 312) are implemented as software instructions, stored in the memory 204, which when executed by the host processor 202, cause the host processor 202 to perform particular function(s).

In one or more implementations, one or more of components of the image sensor 304, the inertial measurement unit 306 (including the accelerometer 308 and the gyroscope 310), and/or the visual inertial odometry module 302 (including the bundle adjustment module 312) may be implemented in software (e.g., subroutines and code), hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices), and/or a combination of both. In one or more implementations, some or all of the depicted components may share hardware and/or circuitry, and/or one or more of the depicted components may utilize dedicated hardware and/or circuitry. Additional features and functions of these modules according to various aspects of the subject technology are further described in the present disclosure.

Figure 4:
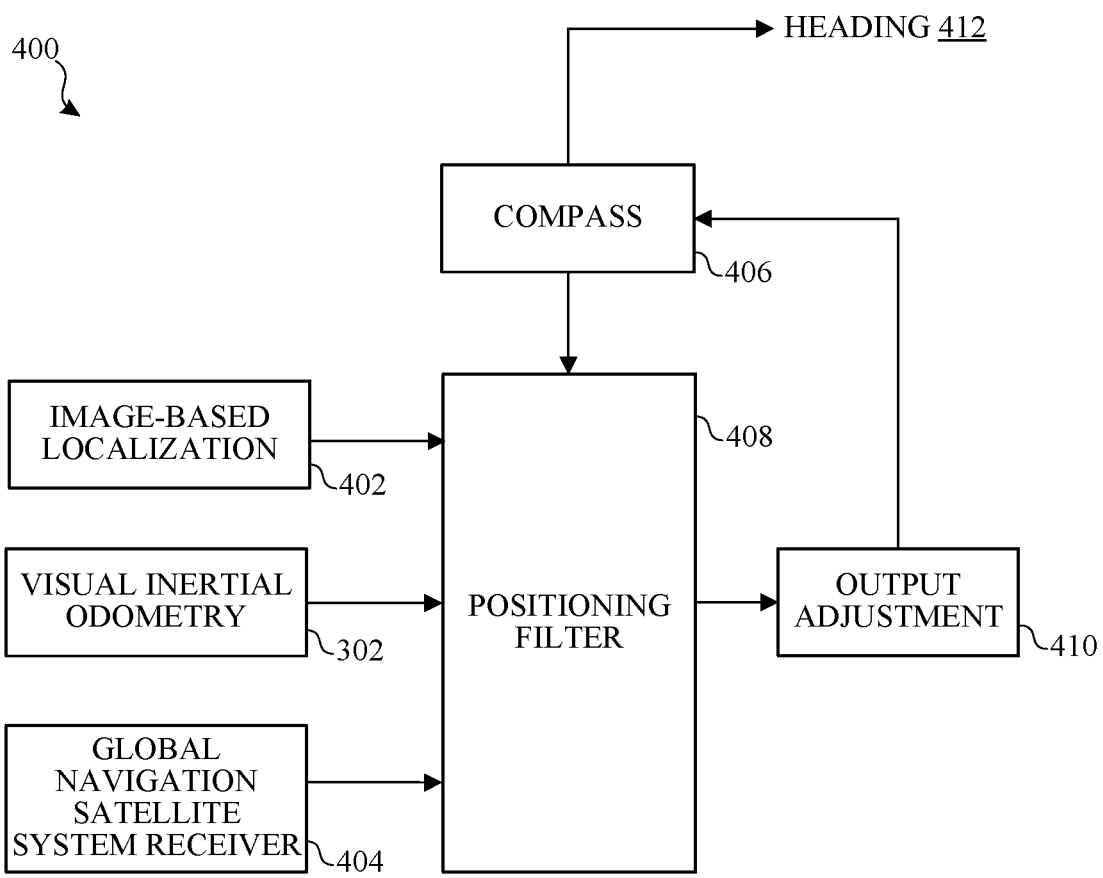
FIG. 4 illustrates an example architecture, that may be implemented by an electronic device, for adjusting magnetometer output in accordance with one or more implementations.

FIG. 4 illustrates an example architecture 400, that may be implemented by the electronic device 102, for adjusting magnetometer output in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

In one or more implementations, the architecture 400 may provide for improved estimates of device heading, for example, for use by an augmented reality application. The improved estimates may be used in presenting digital content (e.g., visual, audio and/or tactile feedback) in images of a real-world environment (e.g., as being captured by the image sensor 304). For example, the timing and/or positioning of notifications (e.g., prompts, overlays, audio cues, tactile feedback and the like) may be based on the estimates provided by the architecture 400.

The architecture 400 may include an image-based localization module 402, the visual inertial odometry module 302, a GNSS receiver 404, a positioning filter 408, a output adjustment module 410 and a compass 406. The positioning filter 408 (e.g., implemented as a particle filter) may receive data associated with device heading from one or more of the image-based localization module 402, the visual inertial odometry module 302, the GNSS receiver 404 and the compass 406. The positioning filter 408 may provide an indication of bias associated with the output of the magnetometer (e.g., bias attributable to the magnetometer) to the output adjustment module 410, which is configured to adjust the output of magnetometer for the estimated heading 412 (e.g., based on the bias). For example, the output adjustment module 410 may provide an indication of the bias to the compass 406, which is configured to adjust its output (e.g., of device heading) based on the determined bias.

In one or more implementations, the compass 406 may be a digital (e.g., electronic) compass which includes a magnetometer. As noted above, the sensor(s) 206 of the electronic device 102 may include the magnetometer (e.g., an integrated circuit chip) for determining an estimate of device heading. As shown in FIG. 4, the compass may provide the estimated device heading to the positioning filter 408.

The positioning filter 408 (e.g., implemented as a particle filter) may be configured to receive additional estimates related to device heading, for example, from one or more of the image-based localization module 402, the visual inertial odometry module 302 and the GNSS receiver 404. As discussed above with respect to FIG. 3, the visual inertial odometry module 302 may be configured to determine device position and/or orientation, where the orientation may include device heading. The heading may correspond to the angle of the electronic device 102 relative to magnetic north. In one or more implementations, the angle may be with respect to the top of the electronic device 102.

In one or more implementations, the image-based localization module 402 may be configured to provide one or more estimates of device heading. In one or more implementations, the image-based localization module 402 is configured to receive images (e.g., as captured by the image sensor 304), and to determine vanishing point(s) within the captured images. A vanishing point may correspond to a point on the image plane where parallel lines appear to converge.

For example, in a case where the user is holding the electronic device 102 in an upright position while viewing the screen, a rear-facing camera of the electronic device 102 may be capturing image data (e.g., a stream of images, such as video). In one or more implementations, the image-based localization module 402 may detect vanishing points by determining where parallel lines appear to converge in the captured images. For example, the vanishing point(s) may correspond to the far end of a pathway (e.g., a road, sidewalk, street or the like) appearing in the image.

The image-based localization module 402 is further configured to correlate the detected vanishing point(s) with known map data. In one or more implementations, the map data may correspond to map tiles stored locally on the electronic device 102, for example, as provided by a web mapping service configured to provide map tiles based on general device location (e.g., from GNSS positioning estimates). The map data may include information for a known pathway (e.g., road, sidewalk, street pathways or the like). Based on this information, the image-based localization module 402 may align the parallel lines for vanishing point(s) in the image with the known pathway, and estimate heading of the electronic device 102 based on such alignment.

In one or more implementations, the image-based localization module 402 may provide two (or more) estimates for device heading. For example, while the direction of the image sensor 304 may be aligned to the pathway (e.g., based on a single vanishing point), the front or rear-facing direction of the electronic device 102 relative to the map data may be unknown. Further, in some instances, it is possible for the image-based localization module 402 to detect multiple vanishing points (e.g., if there are multiple candidates for pathway(s) that correlate to map features), with each of these vanishing points having two candidates for device heading.

Moreover, the image-based localization module 402 may be configured to provide a weight value (e.g., confidence score) for each of the candidates for device heading. For example, the respective weight values may be based at least partially on the map data (e.g., likelihood that the user is on one pathway vs. another pathway, likelihood that user is walking in one direction vs. another direction on a pathway, and the like).

In one or more implementations, the GNSS receiver 404 is configured to receive signals received from the GNSS satellites 104a-104d, in order to determine estimates for a position and/or direction of motion for the electronic device 102. The direction of motion may relate to device heading. For example, an assumption can be made that the user is generally holding the electronic device 102 in an upright position while viewing the screen. As such, it can be assumed that the user is not holding the electronic device 102 in certain positions. For example, the user may typically not be holding the electronic device 102 facing sideways (e.g., although it is possible to detect how the user is holding the electronic device 102 based on the sensor(s) 206). Based on these assumptions and the estimated direction of motion, it is possible to estimate bias associated with device heading (e.g., as provided by the compass 406).

The positioning filter 408 (e.g., implemented as a particle filter) is configured to estimate the bias for device heading as provided the compass 406. The positioning filter 408 may receive the output from each of the image-based localization module 402, the visual inertial odometry module 302 and the GNSS receiver 404 as input. As noted above, the image-based localization module 402 may provide multiple estimates of device heading (e.g., with respective weight values), the visual inertial odometry module 302 may provide a separate estimate of device heading (e.g., which may have a respective weight value), and the GNSS receiver 404 may provide a direction of motion (e.g., which may have a respective weight value).

The positioning filter 408 may receive these estimates of heading and/or direction of motion, together with the estimate of device heading from the compass 406, in order to determine an amount of bias associated with output of the compass 406. For example, the bias may be based on the respective weight values of estimates as provided by the image-based localization module 402, the visual inertial odometry module 302 and/or the GNSS receiver 404.

The positioning filter 408 may provide the estimated bias to the output adjustment module 410, which is configured to adjust output of the compass 406 (e.g., corresponding to device heading as provided by the magnetometer) to compensate for the estimated bias. The estimated heading 412 as output by the compass may therefore correspond to magnetometer output, which has been adjusted based on signals (e.g., associated with bias) received from one or more of the image-based localization module 402, the visual inertial odometry module 302 or the GNSS receiver 404.

As described above, the positioning filter 408 may be implemented as a particle filter which is used to estimate bias (e.g., based on multiple estimates associated with device heading). However, it is possible for the architecture 400 to perform such filtering in other manners. In this regard, a particle filter is one example of component for blending together the information, measurements and assumptions described herein. Other filters (e.g., Bayesian, non-Bayesian) and/or estimators may be used in lieu of, or as a supplement to, a particle filter. For example, the positioning filter 408 may correspond to a Kalman filter, a sigma point filter and/or any other type of filter configured to estimate bias as described herein.

Moreover, while the example of FIG. 4 illustrates adjustment of magnetometer output, the subject system is not necessarily limited to such. The subject system may generally provide for combining possibly-biased and possibly-multi-hypothesis heading measurements from multiple sources into a single (e.g., unbiased or reduced bias) heading estimate. For example, sources of the heading estimates, may be one or more of a magnetometer, an image-based point cloud matching, image-based road detection, a star tracker, a gyrocompass, a calibrated INS, an attitude and heading reference system (AHRS) and the like.

In one or more implementations, one or more components of the image-based localization module 402, the visual inertial odometry module 302, the GNSS receiver 404, the positioning filter 408, the output adjustment module 410 and/or the compass 406 are implemented as software instructions, stored in the memory 204, which when executed by the host processor 202, cause the host processor 202 to perform particular function(s).

In one or more implementations, one or more components of the image-based localization module 402, the visual inertial odometry module 302, the GNSS receiver 404, the positioning filter 408, the output adjustment module 410 and/or the compass 406 may be implemented in software (e.g., subroutines and code), hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices), and/or a combination of both. In one or more implementations, some or all of the depicted components may share hardware and/or circuitry, and/or one or more of the depicted components may utilize dedicated hardware and/or circuitry. Additional features and functions of these modules according to various aspects of the subject technology are further described in the present disclosure.

Figure 5:
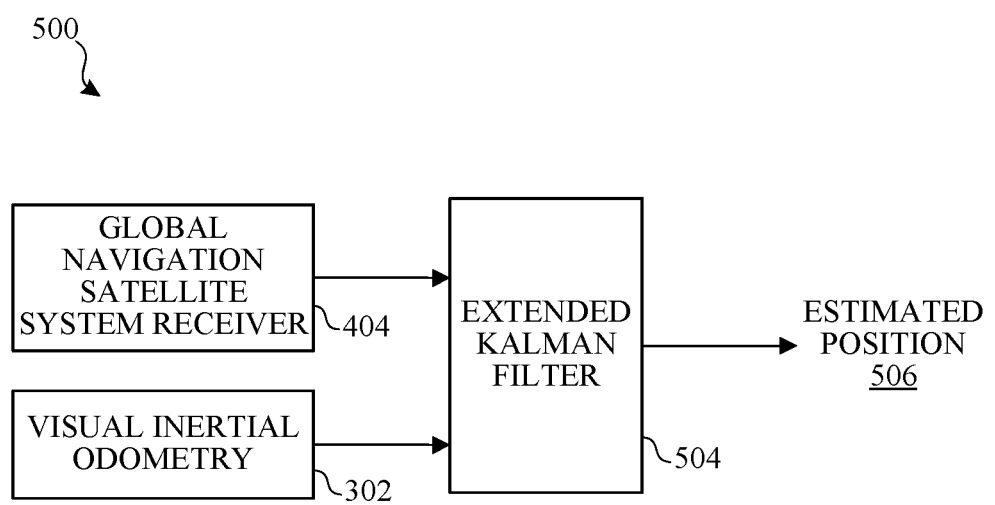
FIG. 5 illustrates an example architecture, that may be implemented by an electronic device, for performing stabilization of visual inertial odometry in accordance with one or more implementations.

FIG. 5 illustrates an example architecture 500, that may be implemented by the electronic device 102, for performing stabilization of visual inertial odometry in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

In one or more implementations, the architecture 500 may provide for improved estimates of device position, for example, for use by an augmented reality application. The improved estimates may be used in presenting digital content (e.g., visual, audio and/or tactile feedback) in images of a real-world environment (e.g., as being captured by the image sensor 304). For example, the timing and/or positioning of notifications (e.g., prompts, overlays, audio cues, tactile feedback and the like) may be based on the estimates provided by the architecture 500.

The architecture 500 may include the GNSS receiver 404 and the visual inertial odometry module 302 from FIGS. 3-4. In addition, the architecture 500 may include an extended Kalman filter 504. As shown in FIG. 5, the extended Kalman filter may receive signals from the GNSS receiver 404 and the visual inertial odometry module 302 as input, and may provide an estimated device position 506 as output.

The architecture 500 may provide for fusing (e.g., aligning) the output of the visual inertial odometry module 302 with positioning data received by the GNSS receiver 404. The GNSS receiver 404 may define a measurement interval (or "epoch") by which the GNSS receiver 404 receives signals from GNSS satellites 104a-104d. Thus, the GNSS receiver 404 may be configured to estimate a first device position (e.g., in absolute latitude-longitude coordinates) at a first time, and a second device position at a second time, the first and second times being defined by the measurement interval.

Moreover, the visual inertial odometry module 302 may be configured to estimate a relative distance traveled and/or direction of travel with respect to a reference point (e.g., the first position). In turn, the estimated distance traveled and/or direction of travel may be used to predict the next GNSS position (e.g., the second position).

The extended Kalman filter 504 may receive the output from the visual inertial odometry module 302 (e.g., corresponding to its estimates for the first and second positions) and the output from the GNSS receiver 404 (e.g., corresponding to its estimate of the second position). In one or more implementations, the extended Kalman filter 504 may correspond to an algorithm that uses a series of measurements/signals (e.g., which may contain noise and other inaccuracies) observed over time, and that produces estimates of unknown variables (e.g., device state/position) which tend to be more accurate than those based on a single measurement alone (e.g., single GNSS measurements). Thus, the extended Kalman filter 504 may be configured to use the respective estimates of the second position (e.g., as provided by the visual inertial odometry module 302 and the GNSS receiver 404) to determine the estimated position 506.

In one or more implementations, the visual inertial odometry module 302 may experience drift. For example, the drift may be attributed to yaw rotation (e.g., motion about the perpendicular axis) of the electronic device 102. Due to the estimates of the visual inertial odometry module 302 being relative (e.g., to a reference point), the drift may increase with distance traveled. For example, if the drift error is 1%, 1 kilometer of travel distance from the reference point may result in 10 meters of drift error.

The architecture 500 provides for fusing the estimated position(s) provided by the visual inertial odometry module 302 with the estimated position(s) provided by the GNSS receiver 404 (e.g., on a per-epoch basis, subject to a distance requirement as discussed below). Thus, it is possible for the architecture 500 (e.g., via the extended Kalman filter 504) to reduce drift error associated with the visual inertial odometry module 302.

In one or more implementations, the sampling frequency of the visual inertial odometry module 302 may not match that of the GNSS receiver 404. For example, the visual inertial odometry module 302 may have a sampling frequency of 10 Hz (e.g., 10 frames captured per second), whereas the GNSS receiver 404 may have a sampling frequency of 1 Hz (e.g., 1 signal received per second). In such a case, the lower sampling frequency measurement (e.g., by the GNSS receiver 404) may be interpolated so as to correspond with the higher sampling frequency measurements (e.g., by the visual inertial odometry module 302).

In one or more implementations, the extended Kalman filter 504 may implement a requirement for a minimum distance traveled between position estimates. For example, the minimum distance may be set to 3 meters. It may be possible for the visual inertial odometry module 302 to indicate a distance traveled of 50 cm (e.g., representing an accurate amount of distance traveled from a reference point), while the GNSS receiver 404 may indicate a distance traveled of 5 meters (e.g., representing an inaccurate amount of distance traveled from the reference point). For example, the 5 meters as indicated by the GNSS receiver 404 may be erroneous due to multipath reflection (e.g., from buildings as shown in FIG. 1). The extended Kalman filter 504 may therefore implement a requirement that one or both of the visual inertial odometry module 302 and the GNSS receiver 404 provide estimates of travel distance that meet the minimum distance (e.g., 3 meters), before compensating for drift error associated with the visual inertial odometry module 302.

As noted above, the extended Kalman filter 504 provides for fusing (e.g., aligning) the estimated position(s) provided by the visual inertial odometry module 302 with the estimated position(s) provided by the GNSS receiver 404 on a per-epoch basis (e.g., subject to the above distance requirement). Alternatively, it is possible to transform the coordinate system of the visual inertial odometry module 302 (e.g., corresponding to relative coordinates) to the coordinate system of the GNSS receiver 404 (e.g., corresponding to absolute coordinates of longitude-latitude). For example, based on the relative distance traveled and/or amount of rotation as provided by the visual inertial odometry module 302, it may be possible to generate a transform for translating the relative coordinates of the visual inertial odometry module 302 to absolute coordinates. This transform may be applied to the visual inertial odometry module 302 in order to obtain absolute coordinates.

In one or more implementations, Equation 1 below may be used in generating the transform for translating the relative coordinates of the visual inertial odometry module 302 to absolute coordinates:

$$\begin{bmatrix} P_x \\ P_y \\ P_z \end{bmatrix} \Rightarrow \underbrace{\vec{X}_G}_{\text{latitude, longitude}} = {}^G_V\hat{R}\vec{X}_{VIO} + \vec{T}_G \quad \text{(Equation 1)}$$

In Equation 1, in one or more implementations, R may represent a rotation matrix from relative coordinates to absolute coordinates, X may represent the position estimate, with elements (X, Y, Z) in relative coordinates, and T may represent a translation from the origin of a relative coordinate frame to the origin of the absolute (e.g., Earth-fixed) coordinate frame.

In one or more implementations, one or more of components of the GNSS receiver 404, the visual inertial odometry module and/or the extended Kalman filter 504 are implemented as software instructions, stored in the memory 204, which when executed by the host processor 202, cause the host processor 202 to perform particular function(s).

In one or more implementations, one or more of components of the GNSS receiver 404, the visual inertial odometry module and/or the extended Kalman filter 504 may be implemented in software (e.g., subroutines and code), hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices), and/or a combination of both. In one or more implementations, some or all of the depicted components may share hardware and/or circuitry, and/or one or more of the depicted components may utilize dedicated hardware and/or circuitry. Additional features and functions of these modules according to various aspects of the subject technology are further described in the present disclosure.

Figure 6:
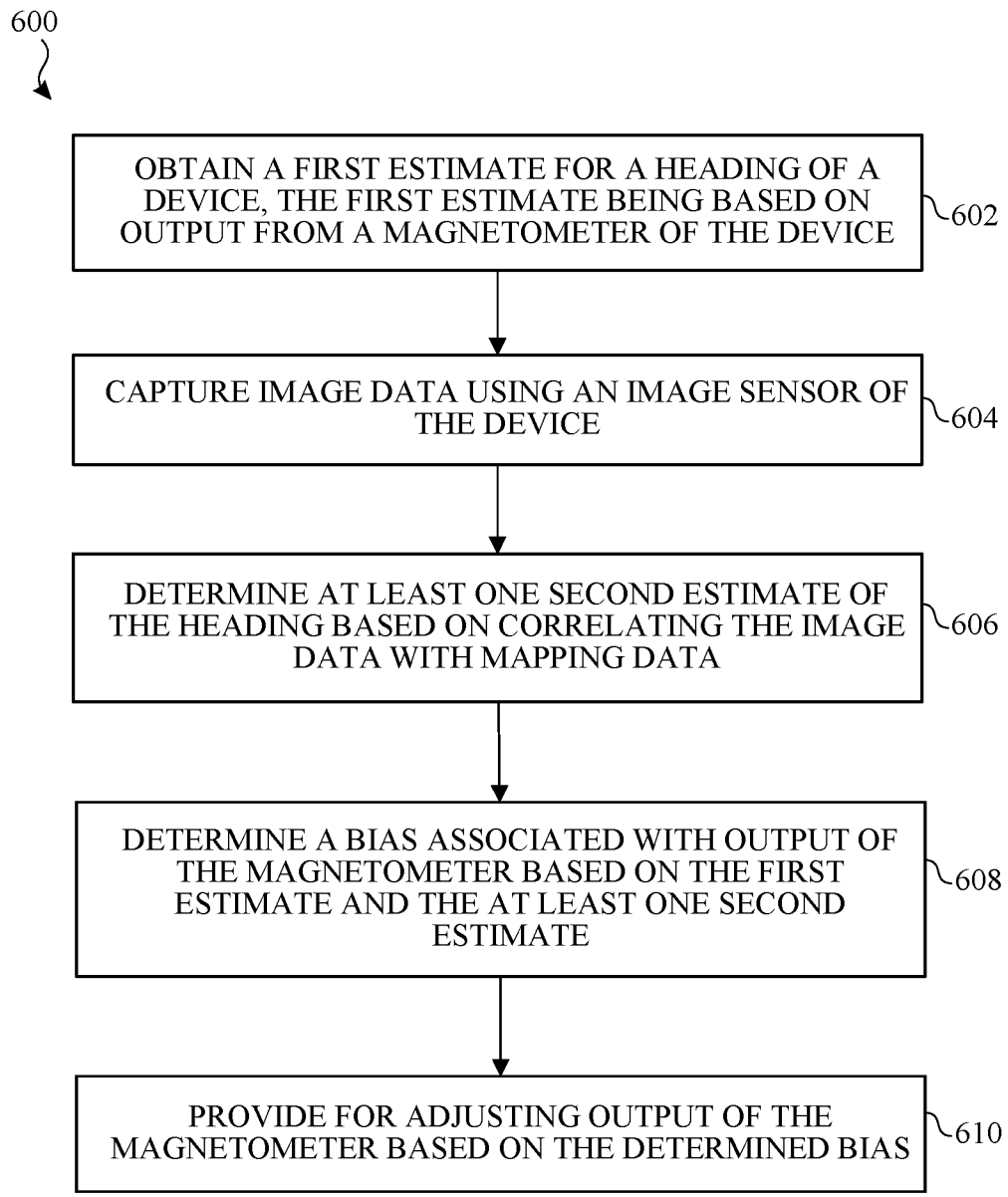
FIG. 6 illustrates a flow diagram of an example process for adjusting magnetometer output in accordance with one or more implementations.

FIG. 6 illustrates a flow diagram of an example process for adjusting magnetometer output in accordance with one or more implementations. For explanatory purposes, the process 600 is primarily described herein with reference to the electronic device 102 of FIG. 1. However, the process 600 is not limited to the electronic device 102 and one or more blocks (or operations) of the process 600 may be performed by one or more other components of the electronic device 102, and/or by other suitable devices. Further for explanatory purposes, the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

The electronic device 102 obtains a first estimate for a heading of a device, the first estimate being based on output from a magnetometer of the device (602). The electronic device 102 captures image data using an image sensor of the device (604).

The electronic device 102 determines at least one second estimate of the heading based on correlating the image data with mapping data (606). The at least one second estimate may correspond to vanishing points in the image data that correlate with a road indicated by the mapping data.

The electronic device 102 determines a bias in the output of the magnetometer based on the first estimate and the at least one second estimate (608). Determining the bias may be based on a particle filter configured to receive multiple candidate estimates for the heading of the device, the multiple candidate estimates being derived from the vanishing points.

The electronic device 102 may determine, based on the image data, an additional estimate for at least one of a device orientation or a device position relative to a reference point associated with the device. Alternatively or in addition, the electronic device 102 may determine, using a Global Navigation Satellite System (GNSS) sensor of the device, an additional estimate for a direction of motion of the device. Determining the bias may be further based on one or more of these additional estimates.

The electronic device 102 provides for adjusting output of the magnetometer based on the determined bias (610). For example, the bias may be provided to a compass associated with the magnetometer, and the compass may be configured to adjust output of device heading based on the determined bias. Capturing the image data may be performed in association with, for example, an augmented reality application running on the device. The augmented reality application may be configured to provide real-time feedback based on the adjusted output of the magnetometer.

Figure 7:
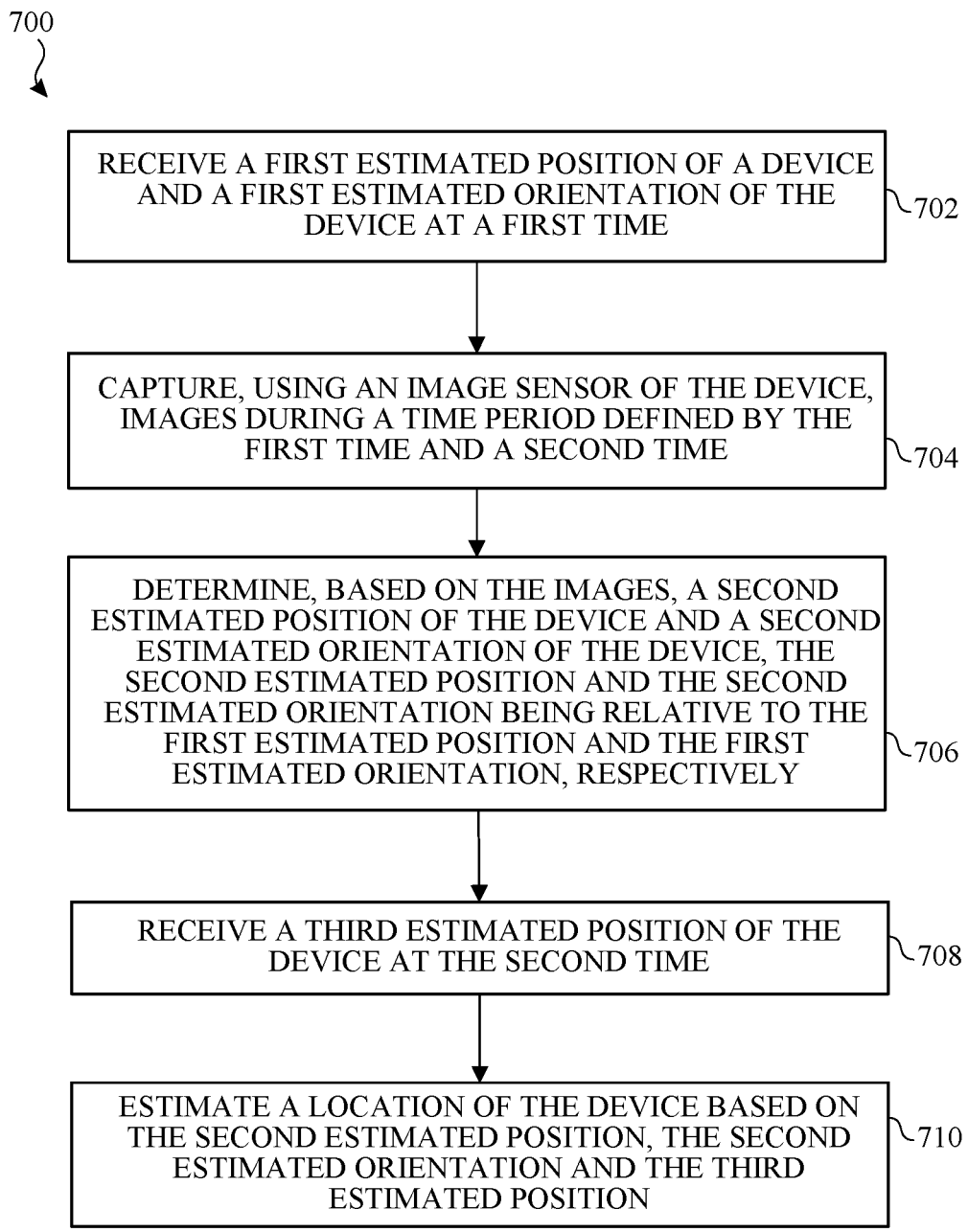
FIG. 7 illustrates a flow diagram of an example process for estimating device position and/or orientation in accordance with one or more implementations.

FIG. 7 illustrates a flow diagram of an example process for estimating device position and/or orientation in accordance with one or more implementations. For explanatory purposes, the process 700 is primarily described herein with reference to the electronic device 102 of FIG. 1. However, the process 700 is not limited to the electronic device 102 and one or more blocks (or operations) of the process 700 may be performed by one or more other components of the electronic device 102, and/or by other suitable devices. Further for explanatory purposes, the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

The electronic device 102 receives a first estimated position of a device at a first time (702). The electronic device 102 captures, using an image sensor of the device, images during a time period defined by the first time and a second time (704).

The electronic device 102 determines, based on the images, a second estimated position of the device, the second estimated position being relative to the first estimated position (706). For example, the first estimated position may correspond to a reference point, and the second position is an amount of measured change from the reference point. The electronic device 102 may receive a first estimated orientation of the device at the first time, and determine, based on the images, a second estimated orientation of the device, the second estimated orientation being relative to the first estimated orientation. The second estimated position and the second estimated orientation of the device may respectively correspond to an amount of distance traveled and an amount rotation since the first time.

The electronic device 102 receives a third estimated position of the device at the second time (708). The first and third estimated positions may be based on Global Navigation Satellite System (GNSS) measurements. The third estimated position may be used to compensate for drift associated with the second estimated position.

The electronic device 102 estimates a location of the device based on the second estimated position and the third estimated position (710). Estimating the location of the device may be further based on the second estimated orientation. Estimating the location may be based on output from a Kalman filter (e.g., an extended Kalman filter) configured to receive the first, second and third estimated positions, and the first and second estimated orientations as input.

Capturing the image data may be performed in association with an augmented reality application running on the device. The augmented reality application may be configured to provide real-time feedback based on the adjusted output of the magnetometer.

As described above, one aspect of the present technology is the gathering and use of data available from specific and legitimate sources for estimating device location and/or orientation. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for estimating device location and/or orientation. Accordingly, use of such personal information data may facilitate transactions (e.g., on-line transactions). Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of estimating device location and/or orientation, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 8:
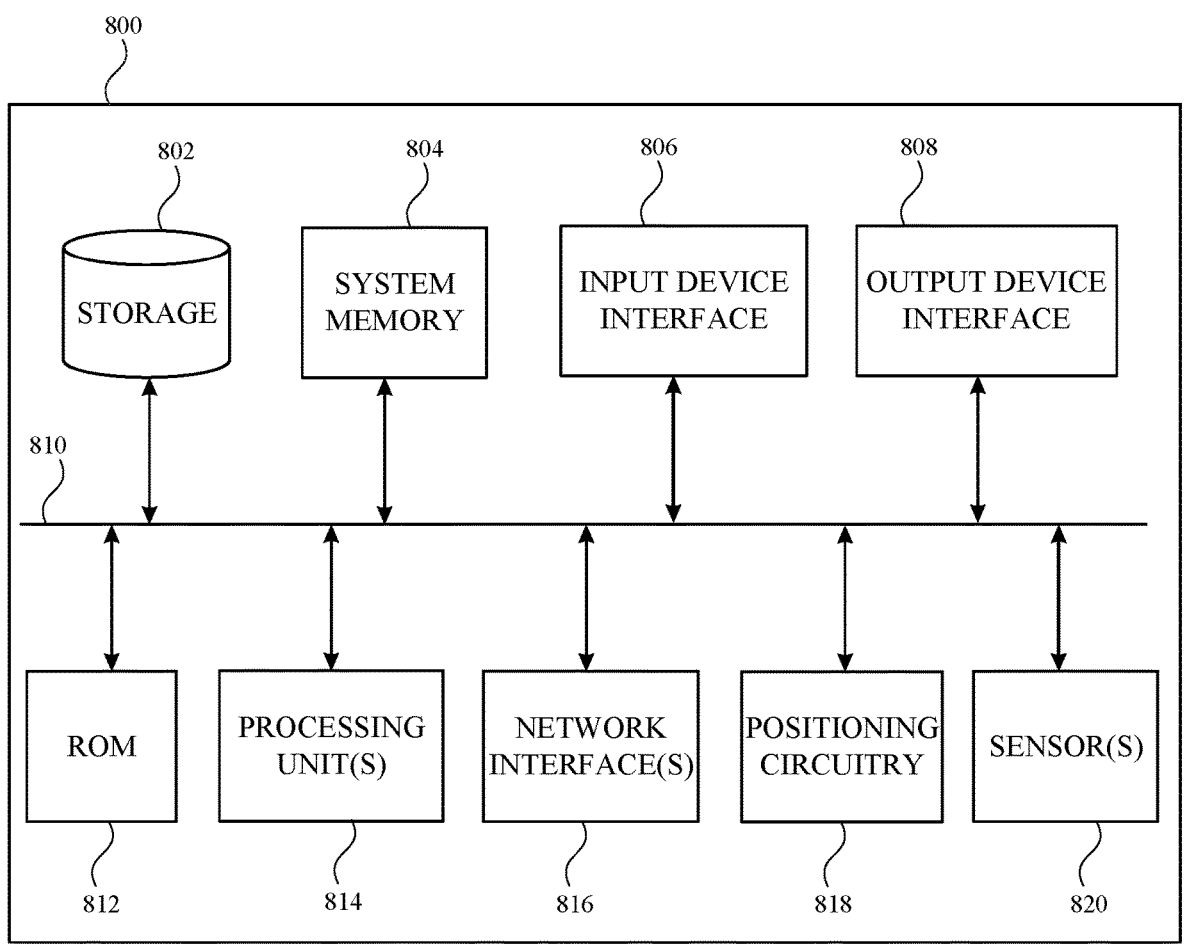
FIG. 8 illustrates an example electronic system with which aspects of the subject technology may be implemented in accordance with one or more implementations.

FIG. 8 illustrates an example electronic system with which aspects of the subject technology may be implemented in accordance with one or more implementations. The electronic system 800 can be, and/or can be a part of, any electronic device for generating the features and processes described in reference to FIGS. 1-5, including but not limited to a laptop computer, tablet computer, smartphone, and wearable device (e.g., smartwatch, fitness band). The electronic system 800 may include various types of computer readable media and interfaces for various other types of computer readable media. The electronic system 800 includes one or more processing unit(s) 814, a permanent storage device 802, a system memory 804 (and/or buffer), an input device interface 806, an output device interface 808, a bus 810, a ROM 812, one or more processing unit(s) 814, one or more network interface(s) 816, positioning circuitry 818, sensor(s) 820, and/or subsets and variations thereof.

The bus 810 collectively represents all system, peripheral, and chipset buses that communicatively connect the numerous internal devices of the electronic system 800. In one or more implementations, the bus 810 communicatively connects the one or more processing unit(s) 814 with the ROM 812, the system memory 804, and the permanent storage device 802. From these various memory units, the one or more processing unit(s) 814 retrieves instructions to execute and data to process in order to execute the processes of the subject disclosure. The one or more processing unit(s) 814 can be a single processor or a multi-core processor in different implementations.

The ROM 812 stores static data and instructions that are needed by the one or more processing unit(s) 814 and other modules of the electronic system 800. The permanent storage device 802, on the other hand, may be a read-and-write memory device. The permanent storage device 802 may be a non-volatile memory unit that stores instructions and data even when the electronic system 800 is off. In one or more implementations, a mass-storage device (such as a magnetic or optical disk and its corresponding disk drive) may be used as the permanent storage device 802.

In one or more implementations, a removable storage device (such as a floppy disk, flash drive, and its corresponding disk drive) may be used as the permanent storage device 802. Like the permanent storage device 802, the system memory 804 may be a read-and-write memory device. However, unlike the permanent storage device 802, the system memory 804 may be a volatile read-and-write memory, such as random access memory. The system memory 804 may store any of the instructions and data that one or more processing unit(s) 814 may need at runtime. In one or more implementations, the processes of the subject disclosure are stored in the system memory 804, the permanent storage device 802, and/or the ROM 812. From these various memory units, the one or more processing unit(s) 814 retrieves instructions to execute and data to process in order to execute the processes of one or more implementations.

The bus 810 also connects to the input and output device interfaces 806 and 808. The input device interface 806 enables a user to communicate information and select commands to the electronic system 800. Input devices that may be used with the input device interface 806 may include, for example, alphanumeric keyboards and pointing devices (also called "cursor control devices"). The output device interface 808 may enable, for example, the display of images generated by electronic system 800. Output devices that may be used with the output device interface 808 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information.

One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

The bus 810 also connects to positioning circuitry 818 and sensor(s) 820. The positioning circuitry 818 may be used in determining device location based on positioning technology. For example, the positioning circuitry 818 may provide for one or more of GNSS positioning, wireless access point positioning, cellular phone signal positioning, Bluetooth signal positioning, image recognition positioning, and/or an INS (e.g., via motion sensors such as an accelerometer and/or gyroscope).

In one or more implementations, the sensor(s) 820 may be utilized to detect movement, travel and orientation of the electronic system 800. For example, the sensor(s) may include an accelerometer, a rate gyroscope, and/or other motion-based sensor(s). Alternatively or in addition, the sensor(s) 820 may include one or more audio sensors(s) and/or image-based sensor(s) for determining device position and/or orientation. In another example, the sensor(s) 820 may include a barometer which may be utilized to detect atmospheric pressure (e.g., corresponding to device altitude).

Finally, as shown in FIG. 8, the bus 810 also couples the electronic system 800 to one or more networks and/or to one or more network nodes through the one or more network interface(s) 816. In this manner, the electronic system 800 can be a part of a network of computers (such as a LAN, a wide area network ("WAN"), or an Intranet, or a network of networks, such as the Internet. Any or all components of the electronic system 800 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
    obtaining a first estimate for a heading of a device, the first estimate being based on output from a first sensor of the device;
    capturing image data using a second sensor of the device, the second sensor being an image sensor;
    determining at least one second estimate of the heading based on correlating the image data with predefined mapping data, the correlating comprising aligning a road or pathway identified in the image data with a road or pathway represented in the predefined mapping data and identifying a vanishing point using the aligned road or pathway identified in the image data;
    determining a bias associated with output of the first sensor based on the first estimate and the at least one second estimate; and
    adjusting output of the first sensor based on the determined bias.

2. The method of claim 1, wherein the first sensor is a magnetometer.

3. The method of claim 2, wherein the correlating comprises aligning the road identified in the image data with the road represented in the predefined mapping data.

4. The method of claim 3, wherein determining the bias is based on a particle filter configured to receive multiple candidate estimates for the heading of the device, the multiple candidate estimates being derived from the vanishing points.

5. The method of claim 2, further comprising:
    determining, based on the image data, a third estimate for at least one of a device orientation or a device position relative to a reference point associated with the device, wherein determining the bias is further based on the third estimate.

6. The method of claim 2, further comprising:
determining, using a Global Navigation Satellite System (GNSS) sensor of the device, a third estimate for a direction of motion of the device,
wherein determining the bias is further based on the third estimate.

7. The method of claim 2, wherein capturing the image data is performed in association with an augmented reality application running on the device, and wherein the augmented reality application is configured to provide real-time feedback based on the adjusted output of the magnetometer.

8. A device, comprising:
at least one processor; and
a memory including instructions that, when executed by the at least one processor, cause the at least one processor to:
obtain a first estimate for a heading of the device, the first estimate being based on output from a magnetometer of the device;
capture image data using an image sensor of the device;
determine at least one second estimate of the heading based on aligning a road or pathway identified in the image data with a road or pathway represented in mapping data and identifying a vanishing point using the aligned road or pathway identified in the image data;
determine a bias associated with output of the magnetometer based on the first estimate and the at least one second estimate; and
adjust output of the magnetometer based on the determined bias.

9. The device of claim 8, wherein the aligning comprises aligning the road identified in the image data with the road represented in the mapping data.

10. The device of claim 9, wherein determining the bias is based on a particle filter configured to receive multiple candidate estimates for the heading of the device, the multiple candidate estimates being derived from the vanishing points.

11. The device of claim 8, wherein the instructions further cause the at least one processor to:
determine, based on the image data, a third estimate for at least one of a device orientation or a device position relative to a reference point associated with the device,
wherein determining the bias is further based on the third estimate.

12. The device of claim 8, wherein the instructions further cause the at least one processor to:
determine, using a Global Navigation Satellite System (GNSS) sensor of the device, a third estimate for a direction of motion of the device,
wherein determining the bias is further based on the third estimate.

13. The device of claim 8, wherein capturing the image data is performed in association with an augmented reality application running on the device.

14. The device of claim 13, wherein the augmented reality application is configured to provide real-time feedback based on the adjusted output of the magnetometer.

15. A computer program product comprising code stored in a non-transitory computer-readable storage medium, the code comprising:
code to obtain a first estimate for a heading of a device, the first estimate being based on output from a sensor of the device;
code to capture image data using an image sensor of the device;
code to determine at least one second estimate of the heading based on correlating the image data with mapping data;
code to determine, using a Global Navigation Satellite System (GNSS) sensor of the device, a third estimate for a direction of motion of the device, wherein the sensor is separate from the image sensor and the GNSS sensor;
code to determine a bias associated with output of the sensor based on the first estimate, the at least one second estimate, and the third estimate; and
code to adjust output of the sensor based on the determined bias.

16. The computer program product of claim 15, wherein the at least one second estimate is derived from vanishing points in the image data that correlate with a road indicated by the mapping data.

17. The computer program product of claim 16, wherein determining the bias is based on a particle filter configured to receive multiple candidate estimates for the heading of the device, the multiple candidate estimates being derived from the vanishing points.

18. The computer program product of claim 15, wherein capturing the image data is performed in association with an augmented reality application running on the device.

19. The computer program product of claim 18, wherein the augmented reality application is configured to provide real-time feedback based on the adjusted output of the sensor.

20. The computer program product of claim 18, wherein the bias is determined using a particle filter.

21. The computer program product of claim 15, wherein the sensor comprises at least one of a magnetometer, a barometer, an accelerometer, a rate gyroscope, or an audio-based sensor.

* * * * *